June 5, 1956   L. R. CHAPMAN   2,748,410
DEVICE FOR CLEANING GREASE FITTINGS
Filed Jan. 12, 1953

INVENTOR
Linwood Ross Chapman
ATTORNEYS

United States Patent Office 2,748,410
Patented June 5, 1956

2,748,410

DEVICE FOR CLEANING GREASE FITTINGS

Linwood R. Chapman, Albany, N. Y.

Application January 12, 1953, Serial No. 330,644

6 Claims. (Cl. 15—105)

My invention relates to lubrication, and particularly to a device for cleaning the grease fittings on motor vehicles so that a grease gun may be properly applied thereto.

Most of the grease fittings on motor vehicles are located where they become covered with dirt which makes it impossible properly to apply a grease gun thereto. It is difficult and sometimes impossible properly to clean a fitting by merely wiping it off with a cloth, and the principal object of my invention is to provide a simple device which can be merely slipped over the fitting and turned, not only to clean the end portions of the fittings, but to loosen and dig out any hard caked dirt surrounding the base of the fitting.

I accomplish this object by means of the element described below and illustrated in the accompanying drawing in which—

Referring to the drawing—

Figure 1:
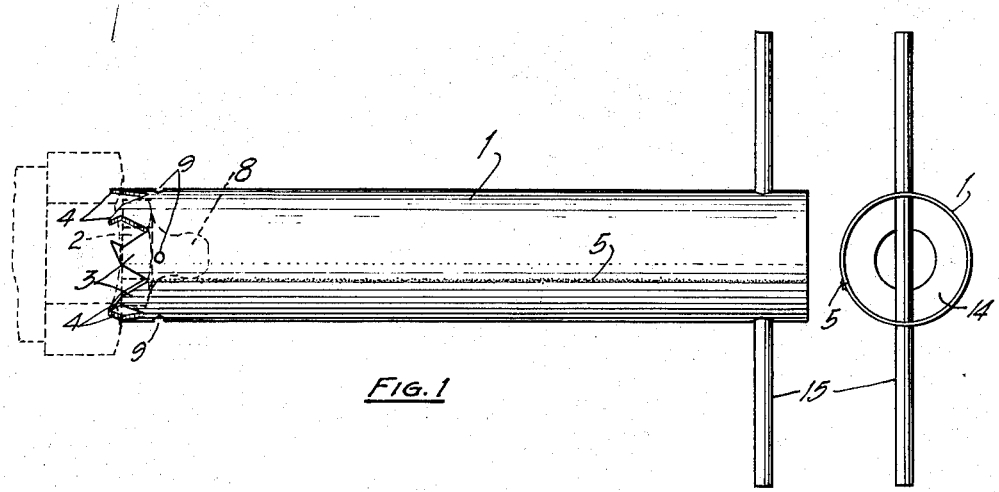
Fig. 1 is an enlarged side elevation view of the device showing in dotted outline a grease fitting and a fragmentary portion of a spring shackle bushing into which the fitting is threaded.

My device comprises a cylindrical, tubular element 1 having an internal diameter sufficient to allow it to pass over but in close proximity to the base 2 of the grease fitting shown in dotted outline in Fig. 1. One end of the tubular element is provided with a plurality of teeth or serrations 3, here illustrated as eight in number.

Figure 2:
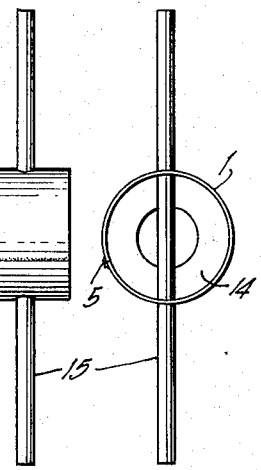
Fig. 2 is a right hand end view of the device, as shown in Fig. 1.
Figure 4:
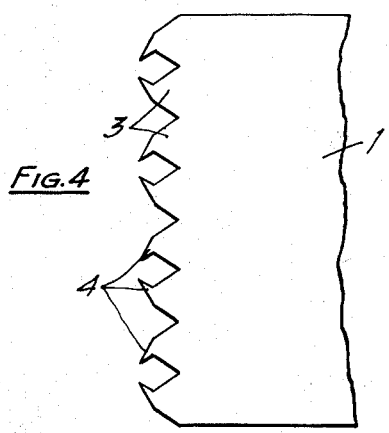
Fig. 4 is a development of the toothed or serrated end of the device.

While these teeth may be substantially triangular like the teeth of an ordinary saw, much better results are obtained by forming the teeth with sharp, hooklike extremities 4, as perhaps best shown in Fig. 4. The tubular element is preferably formed of carbon steel which can be both annealed and hardened. It will be noted that the projections 4 on alternate teeth point in opposite directions so that, when the device is rotated in either direction, half of the teeth will always point in the direction of rotation and thus serve to dig out any hard caked material surrounding the base of the fitting. The tubular element may be readily formed, as shown in Fig. 4, from a flat piece of steel of a width equal to the circumference of the element 1, and the teeth formed by a stamping out operation. The flat steel may then be rolled into cylindrical form and the opposed edges welded together, as shown at 5 in Figs. 1 and 2.

Figure 3:
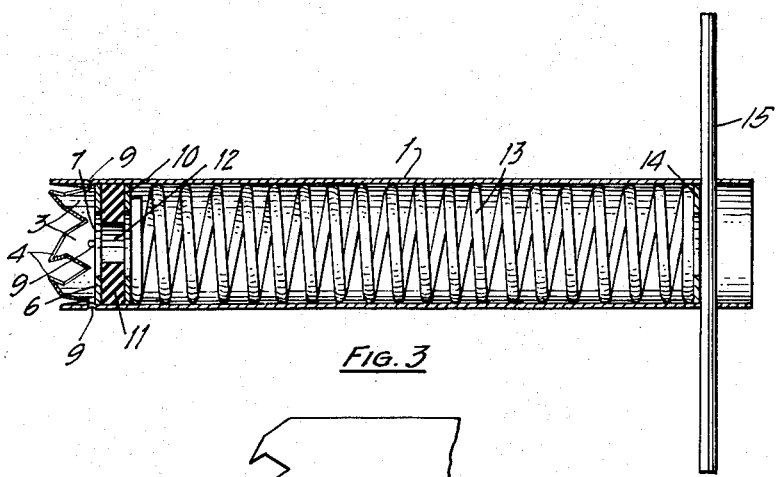
Fig. 3 is a section of Fig. 1 in a vertical plane.

Referring now more particularly to Fig. 3, there is secured within the tubular element 1, and closely adjacent the bottoms of the teeth 3, a washer 6 having a central opening 7 therein of a diameter adapted to pass the end 8 of the fitting (see Fig. 1). As illustrated, the washer 6 is secured in the tube by struck-in portions 9, but it may be secured by welding, or otherwise. A second, similar washer 10 is slidably fitted within the tube, and between the washers 6 and 10 is a comparatively thick rubber washer or annulus 11 having a central opening 12 therein which is smaller than the openings in the washers 6 and 10 but is adapted to pass over and frictionally to engage the end of the fitting when pressed firmly against it.

Within the tube and yieldingly holding the washer 10 and the rubber washer 11 against the washer 6, is a fairly stiff, helical, compression spring 13. The rear end of the spring 13 abuts a washer 14 and it is held within the tube by means of the bar 15 which functions as a handle for rotating or twisting the device in either direction.

In operation, the serrated end of the tube is pushed over the fitting and the tube is oscillated so that the teeth will serve to loosen and dig out any hard dirt that is caked around the fitting. The rubber washer moves into contact with and over the head of the fitting and wipes it perfectly clean. When the rubber washer 11 becomes worn, a new one may be inserted in the device merely by pulling out the handle 15 which will allow the spring to be removed followed by the washer 10 and the worn rubber washer 11.

I have described my invention in its preferred embodiment, but it is to be understood that the words which I have used are words of description rather than of limitation and that changes, within the purview of the appended claims, may be made without departing from the true scope and spirit of my invention in its broader aspects.

What I claim is:

1. A device for cleaning a grease fitting and comprising a tubular element of an internal diameter substantially exceeding the exterior diameter of said fitting, whereby it is adapted to receive said fitting within one end thereof; a rubber annulus within said element adjacent said one end thereof adapted to receive and frictionally engage the surface of said fitting for removing the dirt therefrom when pushed forcibly into contact with and over the end of said fitting; a comparatively stiff compression spring in said element cooperating with said annulus for yieldingly holding said annulus adjacent said one end of said tubular element; and means adjacent the other end of said element for holding said spring therein.

2. The structure set forth in claim 1 in which the end of said tubular element adjacent said annulus is provided with teeth.

3. A device for cleaning a grease fitting and comprising a tubular element of an internal diameter substantially exceeding the exterior diameter of said fitting, whereby it is adapted to receive said fitting within one end thereof; a rubber annulus within said element adjacent said one end thereof adapted to receive and frictionally engage the surface of said fitting for removing the dirt therefrom when pushed forcibly into contact with and over the end of said fitting; a comparatively stiff compression spring in said element cooperating with said annulus for yieldingly holding said annulus adjacent said one end of said tubular element; and removable means at the other end of said tubular element cooperating with said spring for holding it under compression in said element; whereby, said annulus, when worn, may be readily replaced by first removing said spring.

4. The structure set forth in claim 3 in which the end of said tubular element adjacent said annulus is provided with teeth.

5. The structure set forth in claim 3 in which the end of said tubular element adjacent said annulus is provided with teeth having sharp, circumferentially-extending points thereon, some of which extend clockwise from the main bodies of the teeth and some counterclockwise.

6. The structure set forth in claim 3 in which the end of said tubular element adjacent said annulus is provided with teeth having sharp, circumferentially-extending points thereon; the points on adjacent teeth extending in opposite directions.

References Cited in the file of this patent

UNITED STATES PATENTS

| | | |
|---|---|---|
| 445,569 | Morningstar | Feb. 3, 1891 |
| 1,710,127 | Vaughn | Apr. 23, 1929 |
| 2,615,245 | Schaumleffel | Oct. 28, 1952 |

FOREIGN PATENTS

| | | |
|---|---|---|
| 492,954 | Great Britain | Sept. 29, 1938 |